United States Patent [19]
Hubble et al.

[11] Patent Number: 5,741,349
[45] Date of Patent: Apr. 21, 1998

[54] REFRACTORY LINING SYSTEM FOR HIGH WEAR AREA OF HIGH TEMPERATURE REACTION VESSEL

[75] Inventors: David H. Hubble, Export, Pa.; Klaus H. Ulrich, Duisburg, Germany

[73] Assignee: Steel Technology Corporation, Washington, D.C.

[21] Appl. No.: 543,861

[22] Filed: Oct. 19, 1995

[51] Int. Cl.$^6$ .................................................. C21B 15/00
[52] U.S. Cl. ........................... 75/500; 75/433; 266/241; 266/280
[58] Field of Search .................... 266/241, 275, 266/280; 75/433, 500, 501

[56] References Cited

U.S. PATENT DOCUMENTS

| | | | |
|---|---|---|---|
| 395,434 | 1/1889 | Gordon | 266/241 |
| 3,511,643 | 5/1970 | Vallak et al. | 266/241 |
| 3,843,106 | 10/1974 | Nanjyo et al. | 266/241 |
| 5,078,785 | 1/1992 | Ibaraki et al. | 75/386 |
| 5,407,461 | 4/1995 | Hardie et al. | 75/501 |

FOREIGN PATENT DOCUMENTS

| | | | |
|---|---|---|---|
| 1934486 | 1/1971 | Germany | 266/241 |
| 2626211 | 12/1977 | Germany | 266/241 |
| 6-65622 | 3/1994 | Japan . | |
| 6-74656 | 3/1994 | Japan . | |

OTHER PUBLICATIONS

R. Smith, et al., "Coal–Based Ironmaking", Process Development I, 1988 Process Technology Conference Proceedings, pp. 147–178, Apr. 1988.

Lankford, et al., "The Making, Shaping and Treating of Steel", 10th Edition (U.S. Steel) (pp. Intro, 543, 544, 551) Dec. 1990.

General Refractories Company, "Refractories", p. 261, Dec. 1949.

Asbury Carbons "International Sieve Chart" Mar. 1991.

Physical Chemistry of Steelmakers Committee, "Electric Furnace Steelmaking", vol. 1, pp. 162–163, Dec. 1962.

K. Saito, "Study on Direct Iron Ore Smelting Reduction Process (DIOS) and Future Program", Savard/Lee Int'l. Symposium on Bath Smelting, pp. 579, 587, Dec. 1992.

"Systems In Which A Gas Phase Is Not Important" (p. 131) Dec. 1993.

Arnulf Muan, et al. "Phase Equilibria Among Oxides In Steelmaking", copyright Dec. 1965 (p. 131).

*Primary Examiner*—Scott Kastler
*Attorney, Agent, or Firm*—Fitzpatrick, Cella, Harper & Scinto

[57] ABSTRACT

A refractory-lined high temperature reaction vessel comprises a refractory ring lining constructed of refractory brick, a cooler, and a heat transfer medium disposed between the refractory ring lining and the cooler. The refractory brick comprises magnesia (MgO) and graphite. The heat transfer medium contacts the refractory brick and a cooling surface of the cooler, and is composed of a material that accommodates relative movement between the refractory brick and the cooler. The brick is manufactured such that the graphite has an orientation providing a high thermal conductivity in the lengthwise direction through the brick that is higher than the thermal conductivity in directions perpendicular to the lengthwise direction. The graphite preferably is flake graphite, in the range of about 10 to 20 wt %, and has a size distribution selected to provide maximum brick density. The reaction vessel may be used for performing a reaction process including the steps of forming a layer of slag on a melt in the vessel, the slag having a softening point temperature range, and forming a protective frozen layer of slag on the interior-facing surface of the refractory lining in at least a portion of a zone where the surface contacts the layer of slag, the protective frozen layer being maintained at or about the softening point of the slag.

20 Claims, 9 Drawing Sheets

5,741,349

1

REFRACTORY LINING SYSTEM FOR HIGH WEAR AREA OF HIGH TEMPERATURE REACTION VESSEL

NOTICE OF GOVERNMENT INTEREST

The Government of the United States of America has rights in this invention pursuant to Cooperative Agreement No. DE-FC07-89ID12847 awarded by the U.S. Department of Energy.

FIELD OF THE INVENTION

The present invention relates generally to refractory lining systems for high temperature reaction vessels. More particularly, the present invention relates to a novel refractory lining system for a high temperature reaction vessel comprising a refractory ring lining composed of high thermal conductive refractory brick and a dimensionally stabilizing heat transfer medium. The system has particular utility in high temperature reaction processes such as smelting and direct ironmaking or steelmaking, but may be used in other systems and high temperature reaction methods as well.

BACKGROUND OF THE INVENTION

Direct ironmaking and steelmaking processes are known. One such process involves in-bath smelting, where coal, partially reduced iron ore, and oxygen are reacted in an iron bath. The overall process generally includes the three constituent processes of (1) carburization of the metal bath, (2) decarburization of the bath, and (3) heat transfer to the bath. Chemical reduction reactions primarily take place in the bath, while oxidation reactions primarily take place above the bath, e.g., in a foamy slag layer. The reaction process produces CO and $H_2$ gases, which are postcombusted with oxygen in and above the foamy slag to generate heat for driving the process. This postcombustion produces very high temperatures in the reaction process zone and the postcombustion zone of the smelting vessel.

Control of the reaction process in a direct steelmaking process is important for process efficiency and safety. The reaction process primarily is controlled by regulating the feed rates of the raw materials, which include ore pellets, coal, oxygen, and flux. The oxygen feed rate, coal feed rate, and ore feed rate generally are set according to the desired steel production rate, but may be modified to adjust the operating temperature or char volume in the reaction process. The char volume is controlled to achieve a stable foamy slag, and the slag basicity, which affects the stability of the foam, is controlled by the rate of flux addition.

These raw materials are introduced to the reaction process through tuyeres and lances. The gas blowing practice, including tuyere or lance position, hard or soft blow, primary-to-secondary oxygen ratio, and nitrogen (inert gas) stirring energy, has a lesser, but still significant, effect on the reaction process. In particular, the degree of postcombustion is largely controlled by lance position and by the primary-to-secondary oxygen ratio for a given lance design. Primary oxygen is oxygen that is blown well into the slag (a "hard blow") to convert char into carbon monoxide and generate local heat of combustion for the reaction process. Secondary oxygen is oxygen that is blown into the slag and/or free space (head space) above the slag (a "soft blow") to convert rising carbon monoxide into carbon dioxide (a process known as "post combustion") and to generate additional heat of combustion for driving the reaction process.

The reaction vessel in a direct steelmaking process is exposed to extreme, and sometimes critical, conditions. For example, the operating parameters in a direct steelmaking process of the present invention may include molten slag and gas temperatures of up to 1800° C., and the molten slag composition may have a basicity value in the range of about 1.0 to 1.5, where the basicity value represents the ratio of basic oxides to acid oxides. For example, in the direct steelmaking process of the present invention, the basicity value represents the wt. % ratio of lime to silica. Accordingly, successful operation of the reaction process requires mechanical, chemical, and thermal containment.

It is known to use a carbon bosh refractory lining in a high temperature blast furnace, and to provide stave coolers placed inside the bosh shell in such a manner that they cover the entire inner surface of the bosh shell. These linings generally include refractory bricks. However, conventional blast furnaces do not operate under the above-described extreme conditions of a direct steelmaking process. Rather, blast furnaces generally operate with slag temperatures of about 2800° F. or below, whereas a direct steelmaking process according to the present invention may operate with slag temperatures in the range of about 3000° to 3200° F.

Refractory bricks in the postcombustion zone of a steelmaking process of the present invention thus are subject to high wear conditions from a number of factors, including mechanical wear from the abrasive washing action of molten slag, chemical wear from the slag constituents, and thermal wear from exposure to high temperatures in the postcombustion zone. Replacement of refractory lining is costly, both for material and labor, and in terms of system down time.

SUMMARY OF THE INVENTION

It is therefore an object of the present invention to provide an improved high temperature reaction vessel and refractory lining system for high temperature reaction processes, such as direct ironmaking and steelmaking.

Another object of the present invention is to extend the life of refractories in the most severe wear areas of a high temperature reaction vessel, such as the postcombustion zone of a smelting vessel.

Yet another object of the present invention is to provide a refractory-lined high temperature vessel having a stable refractory lining thickness during high temperature operation.

Still another object of the present invention is to provide a cost efficient refractory-lined high temperature reaction vessel for a direct ironmaking or steelmaking process.

In one aspect, the present invention provides a refractory-lined high temperature reaction vessel comprising a refractory ring lining with a surface exposed to the interior of the vessel, the lining being constructed of refractory brick, a hollow cooler exterior to the refactory ring lining, and a heat transfer medium disposed between the refractory ring lining and the cooler. The heat transfer medium fills the space between the refractory brick and the cooler, and is composed of a material that accommodates relative movement between the refractory brick and the cooler.

In another aspect, the present invention provides a refractory brick comprising magnesia (MgO) and graphite. The brick is manufactured such that the graphite particles have an orientation providing a relatively high thermal conductivity in one direction through the brick, that is, a thermal conductivity in one direction that is higher than the thermal conductivity in directions perpendicular to that direction. The graphite preferably is flake graphite, and preferably is present in an amount within the range of about 10 to 20%, based on the weight of the brick. The graphite also preferably has a particle size distribution selected to provide maximum brick density.

In yet another aspect, the present invention relates to a method of manufacturing the refractory brick. The method generally includes the steps of mixing magnesia (MgO) and graphite in an amount sufficient to provide a predetermined thermal conductivity and refractory stability, and pressing the magnesia-graphite mixture to form a refractory brick having a graphite particle orientation that is favorable to high thermal conductivity in one desired direction through the brick.

In still another aspect, the present invention relates to a smelting method for use in a vessel that includes a hollow cooler surrounding a refractory lining having a surface that faces the interior of the vessel. The cooler includes at least one cooler panel having a first surface in thermal contact with the refractory lining ("hot surface", also called "cooling surface"), a second surface in contact with a coolant passing through the cooler panel (coolant heat transfer surface), and a thermal conductivity bridge between the first and second surfaces, so that heat may be withdrawn from the refractory lining and exhausted from the vessel by the coolant. In one embodiment, the first and second surfaces merely are opposite sides of the radially inner wall of a hollow cooler panel made, for example, of copper, in which case the thermal conductivity bridge is the copper that extends between the first and second surfaces, i.e., the thickness of the wall. The method comprises the steps of forming a layer of slag on a melt in the vessel, forming a protective frozen layer of slag on the interior-facing surface of the refractory lining in a zone where the surface contacts the layer of slag, and maintaining the protective frozen layer at or about the softening point of the slag.

These and other objects, aspects and features of the present invention readily will be apparent from the following detailed description of the preferred embodiments, considered together with the accompanying drawings.

DETAILED DESCRIPTION OF THE PREFERRED EMBODIMENTS

Figure 1:
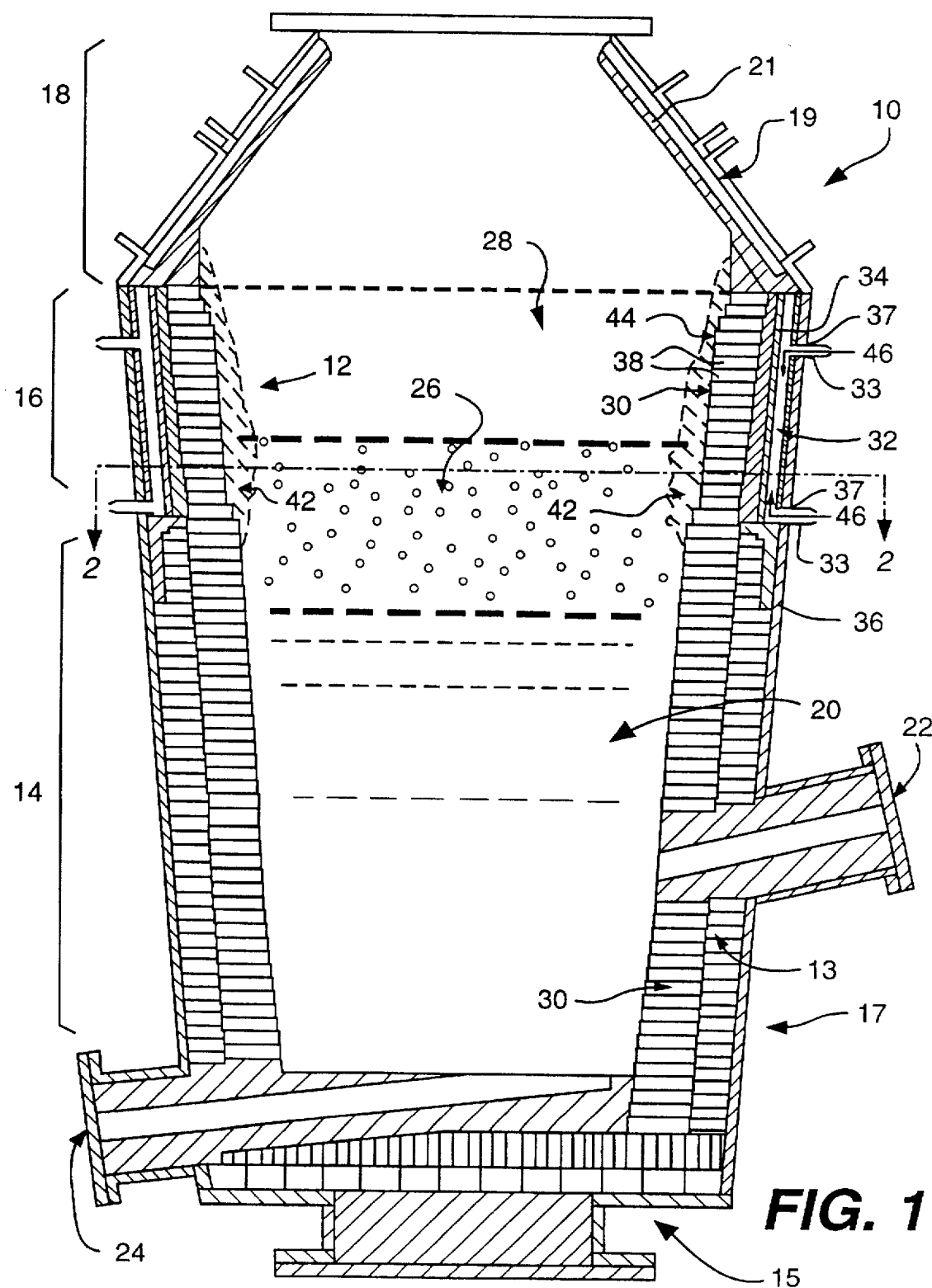
FIG. 1 is a cross-sectional view of a refractory-lined high temperature reaction vessel according to a first embodiment of the present invention.

Referring now to the drawings, wherein reference numerals ending in the same two digits designate like or similar elements in the different embodiments, preferred embodiments of a refractory-lined high temperature reaction vessel of the present invention are illustrated in connection with a direct steelmaking process.

FIG. 1 illustrates in cross-section a high temperature reaction vessel 10 including a refractory lining system 12 of the present invention. The vessel 10 generally includes a lower portion 14, a central portion 16, and an upper portion 18.

The lower vessel portion 14, which includes the hearth 15 and lower bosh 17 of the vessel 10, may be conventional. The lower vessel portion 14 holds the hot liquid metal (e.g., iron or steel) 20 during the reaction process, and generally is composed of conventional materials including refractory brick. Specifically, as shown in FIG. 1, the lower vessel portion may include a first refractory brick lining 30, e.g., composed of a refractory material compatible with the reaction process materials (i.e., chemically compatible with metal and slag) and a second refractory brick lining (safety lining) 13 composed of a different refractory brick having, e.g., a high thermal insulation characteristic and high strength. The lower vessel portion 14 also may include various submerged tuyeres or taps, as is known in the art. For example, in the embodiment of FIG. 1, the vessel 10 includes a charge hole 22 and a drain hole 24, shown in longitudinal cross-section.

The upper vessel portion 18 also may be conventional, and may include various lances and vents. As shown, the upper vessel portion 18 preferably includes a truncated conical cap formed by hollow cooling panels 19. Panels 19 are made of copper and are water-cooled. The surface of each cooling panel 19 that faces the interior of the vessel 10 optionally may have a refractory material coating 21 thereon.

In the direct steelmaking process of the present invention, the various reaction elements, e.g., coal, iron ore, flux, oxygen and inert gases (e.g., nitrogen), are introduced or blown into the vessel through lances or tuyeres, and off-gases are vented to an off-gas system through vents, as is known in the art. The upper vessel portion 18 of the present invention is configured to enclose and seal the reaction vessel 10, to maintain the reaction process at a superatmospheric pressure. The pressure within the vessel 10 is controlled by regulating the amount of gas allowed to flow from the reaction vessel 10 to an off-gas system (not shown). As noted above, control of the pressure in the reaction vessel 10 directly affects the efficiency of the reaction process. For example, the pressure in the vessel 10 directly affects the formation of a slag layer 26, which defines in part a high wear area of the reaction vessel 10, and the size and dynamic characteristics of the slag layer 26 directly affect the efficiency of the reaction process, as is known in the art. The present system successfully has been operated at a pressure in the range of about 10 to 12 psi, and it is anticipated that the reaction process of the present invention will be operated at greater pressures, for example, up to about 50 psi. Those skilled in the art readily will be able to determine the optimal pressure or range of pressures suitable for operation of various reaction processes in accordance with the present invention.

The central vessel portion 16 generally spans at least a portion of the layer of foamy slag 26 and at least a portion of the postcombustion area 28 (generally defined by respective bold dashed lines in FIG. 1), which together constitute a high wear area of the vessel 10 when the vessel is used in a direct steelmaking process of the present invention. As shown, the central portion 16 preferably includes a refractory lining system 12 composed of refractory brick lining 30, hollow cooler panels 32, and a ram mixture 34 disposed between the brick lining 30 and the cooler panels 32.

The system 12 also-preferably includes a metallic outer shell 36 to provide additional structural support to the vessel 10. In particular, nipples 33 of cooler panels 32 may be inserted through holes 37 in the outer shell 36 and fixed thereto, e.g., by welding, to securely fix and support cooler panels 32 in the refractory lining system 12. The shell 36 preferably is made of high strength carbon steel, such as ASTM A633 grade C. However, those skilled in the art readily will be able to select a material suitable for any application.

Figure 2:
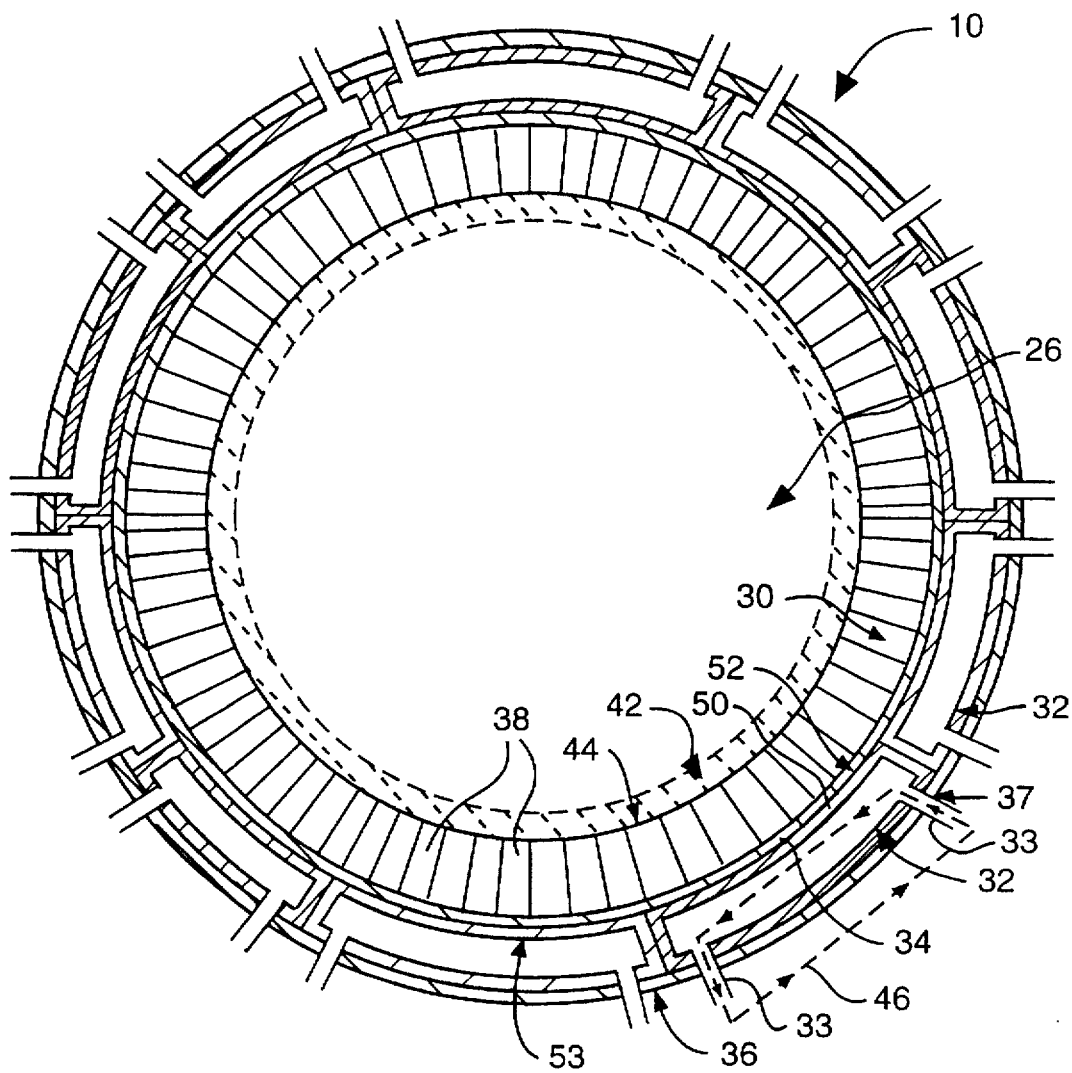
FIG. 2 is a horizontal cross-sectional view of a high wear area of the refractory lining of the vessel of FIG. 1.

FIG. 2 is an enlarged horizontal cross-sectional view of the central vessel portion 16 taken along sectional line 2—2 of FIG. 1. As shown in FIGS. 1 and 2, the refractory brick lining 30 includes refractory bricks 38 which generally are assembled as a wall of concentric rings or courses, using a conventional key-up construction. In the present embodiment, these rings are assembled in a key-up construction with a horizontal expansion allowance in the range of about 0.3 to 0.7%, preferably about 0.3%, such that expansion of the bricks 38 upon heating of the reaction vessel 10 to an operative temperature causes contact between adjacent bricks. Of course, it will be appreciated that the assembly and expansion allowance may vary in accordance with the desired application, and those skilled in the art readily will be able to modify the assembly accordingly.

Figure 3:
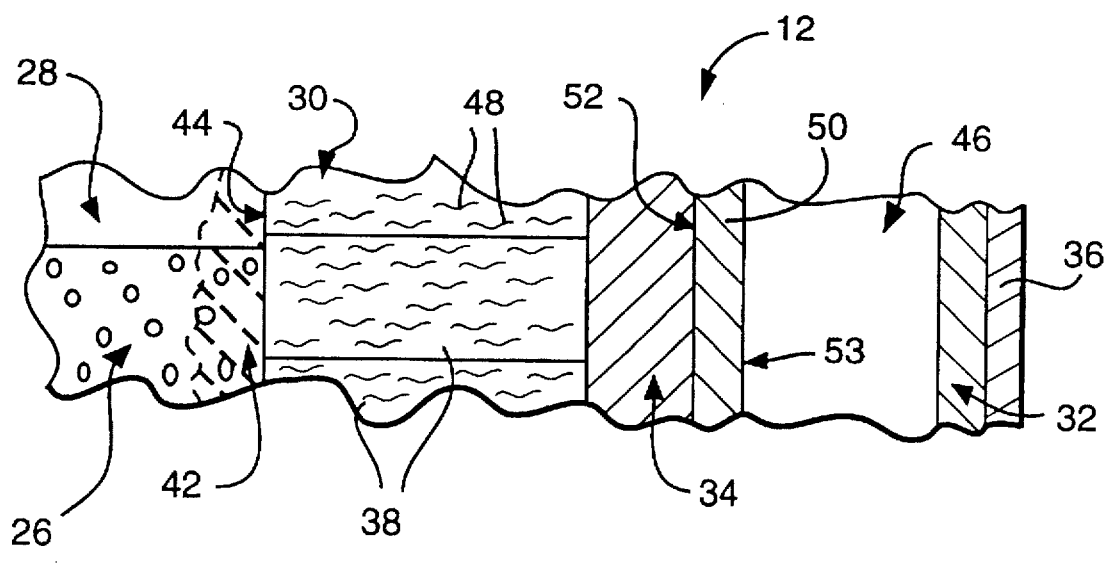
FIG. 3 is a schematic cross-sectional view of the refractory-lined vessel of FIG. 1 in the high wear area of the vessel.

FIG. 3 is an enlarged schematic cross-sectional drawing of a portion of the refractory lining 12 of the high temperature reaction vessel 10 of the present invention in the high wear slag layer and postcombustion zone during stable operation in a direct steelmaking process. As shown therein, during the direct steelmaking process of the present invention, the refractory brick lining 30 generally forms the interior surface of the vessel 10 adjacent the layer of foamy slag 26. The cooler panels 32 are located radially outside the refractory brick lining 30, and the ram mixture 34 is disposed between the refractory brick lining 30 and the cooler panels 32. Shell 36 surrounds cooler panels 32 and provides additional support to the refractory lining 12.

In one aspect, the direct steelmaking method of the present invention includes the step of continuously extracting an amount of heat from the layer of foamy molten slag 26 sufficient to form and maintain a protective layer of "frozen" slag 42 on the interior-facing surface ("hot face") 44 of the refractory brick lining 30 in at least a portion of a high temperature reaction zone (high wear zone) of the reaction vessel 10. This dynamic frozen slag layer 42 is illustrated in FIGS. 1 to 3 by dashed cross-hatching. As shown, the frozen slag layer 42 is formed between the foamy molten slag 26 and the refractory brick lining 30. Moreover, since the reaction process is a violent, dynamic process, the foamy slag splashes and spatters on the interior face 44 of the reaction vessel throughout the postcombustion area 28 and head space. Therefore, it will be appreciated that the protective frozen slag layer 42 effectively prevents excessive wear or failure of the refractory brick lining 30 in the high wear areas during the reaction process, by preventing the constantly moving molten foamy slag 26 from contacting the refractory bricks 38 of the refractory brick lining 30, which contact gradually would erode the bricks by mechanical and chemical wear. It also will be appreciated that the frozen slag layer 42 forms a thermal insulative layer that effectively reduces thermal wear or failure of the refractory lining system 12 in the high wear area due to the high temperatures generated by the postcombustion reaction.

Referring to FIGS. 1 to 3, the protective frozen slag layer 42 is formed and maintained by providing a refractory cooling system 12 capable of conducting sufficient heat from the interior face 44 (e.g., adjacent the layer of molten foamy slag 26) to the cooler panels 32, to maintain a thin protective frozen slag layer 42 at or about the softening or melting point of the slag. Thus, the refractory cooling system 12 must be designed and installed in such a manner as to obtain a high degree of consistent heat transfer from the slag layer 26 and postcombustion area 28 through the refractory brick lining 30 and ram mixture 34 to a coolant 46 circulating through the cooler panels 32.

Figure 4:
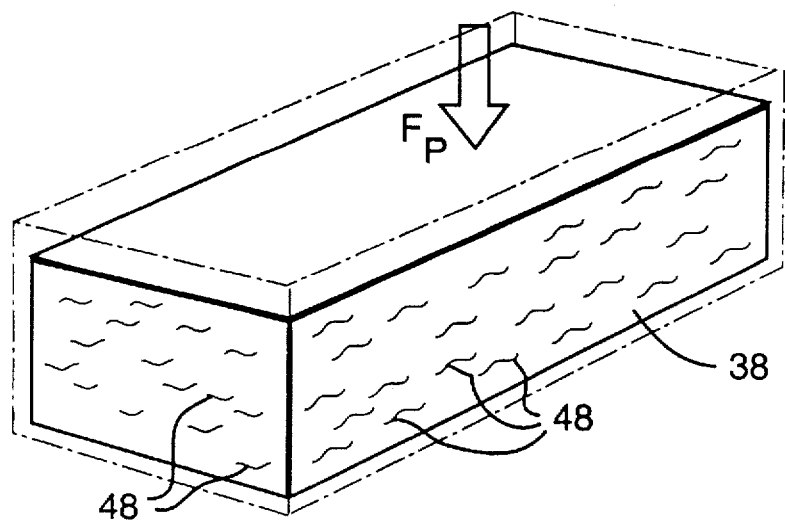
FIG. 4 is a perspective view of a MgO-graphite brick of the present invention, and a method of making such brick.

FIG. 4 schematically illustrates a preferred embodiment of a refractory brick 38 of the present invention. Generally, the refractory brick 38 is composed of MgO-graphite. Magnesia (MgO) is the primary constituent of the refractory brick because of its high refractory characteristics and its compatibility with smelting process slags. Graphite 48 is added to increase the thermal conductivity of the brick. The refractory brick 38 also includes an effective amount of resin binder, preferably a liquid phenolic resin, in an amount in the range of about 2 to 6 wt. %, preferably about 3 to 3.5 wt. %. In the present embodiment, commercially available Quaker Oats UP-440 resin or Borden RL-9S2 resin was used, in an amount in the range of about 3 to 3.5 wt. %. The refractory brick 38 also may include a number of other constituents, including antioxidants such as elemental Mg, Al, or Si, which protect the brick from oxidation during initial heat-up and during the reaction process, by forming metal carbides at the hot-face 44. In the preferred embodiment, about 2 to 6 wt. % of Al or Al-Mg alloy is included, preferably about 3 to 4 wt. %. In the present embodiment, an Al-Mg alloy comprising about 50 wt. % Al was used.

The overall size and composition of the refractory brick 38 is determined based on a balancing of various considerations. On the one hand, it will be appreciated that a greater radial thickness of the refractory brick lining 30 in the high wear region (i.e., the area where the slag layer 26 is maintained and the postcombustion area 28) will result in greater overall insulation and lower overall heat loss from the reaction process. Also, the thicker the lining, the greater the mechanical stability in a large vessel; that is, it will be better able to withstand brief process upsets, heating processes, and cooling shutdowns, while remaining firmly in place. On the other hand, it will be appreciated that extraction of an amount of heat through the refractory brick sufficient to form and maintain a frozen layer of slag on the interior face of the brick (hot face) requires a high rate of thermal transfer through the refractory brick lining 30. Accordingly, the size and constituent elements of the refractory brick 38 are selected to achieve an optimum balance of mechanical stability (brick density), slag corrosion resistance, and thermal conductivity.

The particle size and purity of the magnesia (MgO) generally are selected to provide desired brick strength and density. In the present embodiment, the magnesia (MgO) preferably is fused or sintered magnesia, and preferably has a high purity, most preferably at least about 99% pure. A particle size distribution that will maximize packing density and brick strength preferably is used. In the present embodiment, the majority (and most preferably at least about 75%) of the magnesia (weight basis) preferably will pass 4 mesh and be held on 200 mesh (USA STD/ASTM E 11-87 Seive Series). For example, the particle size distribution may be as follows: −4+14: 50%; −14+48:30%; −48+200:5% and −200:15%. Of course, those skilled in the art readily will be able to select a size and purity distribution of the magnesia to achieve the desired density and strength for a particular application.

In the present embodiment, the thermal conductivity and density of the refractory brick 38 are optimized by making the brick 38 using a coarse flake graphite 48. Examples of suitable graphite flakes commercially available include graphite flakes grades 1040, 475, or 499 distributed by the Brazilian National Graphite Co. The refractory brick 38 is made by mixing the MgO particles with coarse flake graphite particles 48 and pressing the mixture such that the orientation of the flake graphite particles 48 is favorable to high thermal conductivity in a desired direction of the brick 38. Of course, as noted above, the brick also comprises a binder, and the brick is baked or fired at a temperature and for a time sufficient to form a finished brick, as is known in the art.

As shown in phantom in FIG. 4, the brick may be formed in a mold by pressing the mixture with a force Fp from the top, e.g., with a Crossley hydraulic press. The present inventors have discovered that, when such a refractory brick 38 is formed and pressed in this manner, the volume of material in the mold generally is reduced by approximately 10%. The density of a 10 wt. % graphite brick thereby will be increased from a density of about 100 lbs/ft$^3$ to about 185 lbs/ft$^3$, and the graphite flake particles 48 generally will align in an orientation perpendicular to the direction from which force is being applied. Similarly, the density of a 20 wt. % graphite brick may be increased from a density of about 75 lbs/ft$^3$ to about 185 lbs/ft$^3$. If, as is preferred, the cross-section of the brick mold (on a plane perpendicular to the direction of force) has a long dimension (as shown in FIG. 4), then the graphite particles will tend to align themselves with that long dimension of the press mold. Moreover, it will be appreciated that the relative dimensions thus affect the degree of orientation achieved. In this manner, a resultant refractory brick 38 can be formed having a thermal conductivity in one direction that is greater than its thermal conductivity in directions perpendicular to that direction, while maximizing the brick density. As schematically illustrated in FIGS. 3 and 4, bricks 38 include flake graphite particles 48 oriented in a longitudinal direction of the brick 38. In this manner, the refractory brick can be set in the vessel in a key-up construction so as to provide a consistent high thermal conductivity in a direction from the slag 26 to the ram mixture 34 and cooler panels 32.

The size and purity of the graphite particles is selected to provide optimal packing density and heat conductivity characteristics. Generally, there is a trade-off between size and purity. Smaller particles generally provide greater purity; larger particles generally provide greater heat conductivity. In the present embodiment, the graphite has a high purity, preferably at least about 97 wt. % carbon, e.g., about 97 to 99%, and most preferably about 99 wt. % carbon. The graphite preferably is sized predominantly from 20 to 80 mesh (USA STD/ASTM E 11-87 Seive Series), with no more than 10 wt. % finer than 80 mesh, and with at least 40 wt. % (e.g., about half) of the graphite sized from 20 to 40 mesh. Preferably, the graphite has a size distribution wherein about 90 to 100 wt. % of the graphite has a particle size distribution between about 180 and 850 microns in the longest direction, and at least 50 wt. % is between about 450 and 850 microns in the longest direction.

As noted above, one object of the present invention is to provide a refractory brick 38 having a relatively high thermal conductivity in one direction. Table 1 illustrates the thermal conductivity in the longitudinal direction at 2500° F. for seven MgO bricks having a graphite content within the range of 0 to 40 wt. %. All of the bricks were prepared using the procedure depicted in FIG. 4, employing a Crossley hydraulic press. The conductivity was measured by a standard ASTM laser technique (ASTM E-1461, 1992).

TABLE 1

Thermal Conductivity of Various M$_x$O-Graphite Bricks

| Brick | Approximate Graphite Content (wt. %) | Thermal Conductivity BTU-in/hr-ft$^2$-°F. at 2500° F. |
|---|---|---|
| A | 0 | 38 |
| B | 5 | 50 |
| C | 10 | 76 |
| D | 15 | 75 |
| E | 20 | 110 |
| F | 30 | 120 |
| G | 40 | 270 |

It will be appreciated that the thermal conductivity for any given brick will vary with the temperature thereof. In the direct steelmaking process of the present invention, the temperature of the brick varies in the range of about 400° F. (at the cold face) to about 3200° F. (at the hot face); the value of 2500° F. has been chosen for purposes of example only, because during direct reduction of iron ore a large portion of the brick is at or about 2500° F. In any event, as shown in Table 1, the thermal conductivity of MgO-graphite bricks varies directly with the graphite content. That is, the higher the graphite content, the higher the thermal conductivity.

In the direct steelmaking process of the present invention, however, since oxygen is injected into the postcombustion area 28 to oxidize H$_2$ or CO, the oxygen also may oxidize graphite particles in the refractory brick 38, causing excessive chemical wear of the refractory lining. Moreover, the present inventors have recognized that brick having a lower carbon content has a much greater oxidation resistance because: (1) slag forming the frozen protective layer 42 adheres better when the brick 38 has a lower graphite content; (2) antioxidants, (e.g., elemental Mg, Al, or Si) added to the brick 38 are more effective at lower graphite content; and (3) microstructures resulting from the use of less graphite offer inherent protection to the graphite from oxidation. Further, the inherent lower hardness of brick made with a relatively higher graphite content makes the brick more susceptible to mechanical erosion by moving fluids and solids, i.e., by molten foamy slag 26.

Through theoretical calculations, therefore, the present inventors have determined that, although higher refractory thickness stability would be calculated with brick containing a greater graphite content, e.g., about 30 to 40 wt. % graphite, other considerations limit the preferred range to about 10 to 20 wt. % graphite. In making this determination, the present inventors began with the premise that there is a sufficient temperature drop across the thin frozen layer of slag 42 to maintain the protective layer of slag 42 at or near its melting or softening point. Of course, since the composition of the layer of slag 26 is nonhomogeneous and dynamic, it does not have a sharp melting point, but softens and melts over a range of temperatures. Nevertheless, it will be apparent that, by controlling the reaction process conditions, including slag composition, temperature, pressure, and the like, the thermal conductivity of the layer of slag 26 may be maintained within a range sufficiently defined to satisfy the desired criteria.

Table 2 lists various selected parameters of the frozen slag layer used for calculating the mechanical stability of a MgO-graphite brick.

TABLE 2

| | Thickness (Inches) | Slag Conductivity (BTU-in/ft²°F.-hr) |
|---|---|---|
| Δ | 0.25 | 12.5 |
| ○ | 0.25 | 25.0 |
| + | 0.12 | 12.5 |
| × | 0.12 | 25.0 |

Figure 5:
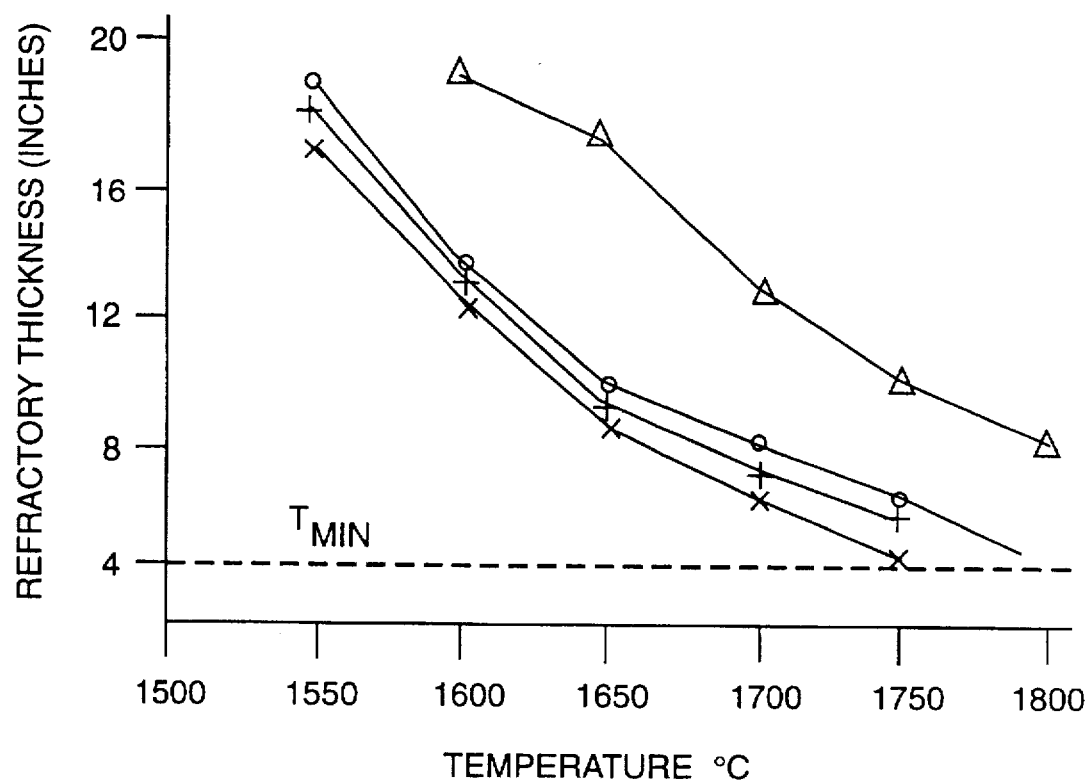
FIG. 5 is a graph illustrating the calculated mechanical stability thickness of a MgO-graphite refractory brick having a 10 wt. % graphite content.

FIG. 5 is a graph of the calculated mechanical stability thickness of a 10 wt. % graphite content refractory brick over a typical reaction process temperature range (e.g., temperature of molten slag) of 1500° to 1800° C. using the parameters of Table 2.

Figure 6:
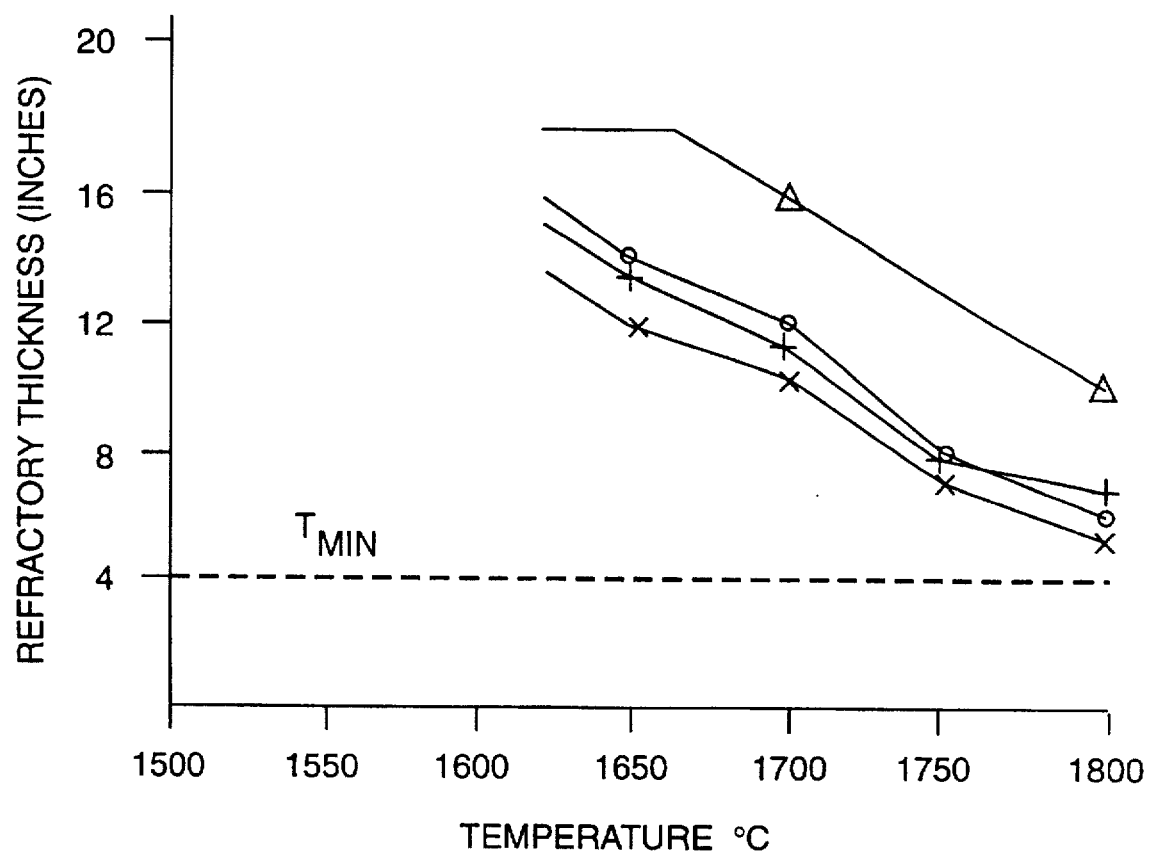
FIG. 6 is a graph illustrating the calculated mechanical stability thickness of a MgO-graphite refractory brick having a 20 wt. % graphite content.

FIG. 6 is a graph of the calculated mechanical stability thickness of a 20 wt. % graphite content refractory brick over a typical reaction process temperature range of 1500° to 1800° C. using the parameters of Table 2.

In the present embodiment, the initial preheat thickness of the refractory brick lining is 18 inches, and the minimum thickness ($T_{MIN}$) for providing mechanical stability is assumed to be about 4 inches. Therefore, the calculated mechanical stability represents the thickness of the brick at process equilibrium, and is determined based on the slag having a melting point of about 1400° C., a thickness of either 0.25 or 0.5 inches (i.e., thickness of protective frozen slag layer 42), and a thermal conductivity of either 12.5 or 25.0 BTU-in/ft²-°F.-hr.

As shown in FIGS. 5 and 6, the calculated mechanical stability (thickness) varies depending on the assumed thickness of the frozen slag layer and the thermal conductivity of the slag, but in all cases it decreases as the difference between the slag melting point and the reaction process temperature increases. Thus, to maximize cooling efficiency the reaction process preferably should be operated with a predictable slag composition and the minimum process temperature compatible with production requirements.

As noted above, the brick also may include one or more antioxidants, to improve the anticorrosion (chemical wear) characteristics of the brick. These antioxidants preferably are selected from the group of metals consisting of Al, Mg, Si, and alloys of two or more of these metals. In the present embodiment, the antioxidants preferably are supplied as particles having a size predominantly (weight basis) in the range of about 4 to 40 mesh (USA STD/ASTM E 11-87 Sieve Series). However, those skilled in the art readily will be able to determine the optimal type, amount, and size of any antioxidants suitable for the desired application.

Referring again to FIG. 3, the cooler panels 32 generally include a cooler panel wall 50 with a cooling panel hot face 52 adjacent the ram mixture 34, and a cooler panel cold face 53 adjacent the coolant 46. The design criteria for the cooler panels 32 in a smelting reaction process generally are twofold. First, the cooler panels 32 must provide highly effective heat transfer from the outer surface (hot face) 52 of the cooler panel 32 through the cooler panel wall 50 and the inner surface 53 (cold face) to the contained circulating coolant 46. Second, the cooler panels 32 must be capable of withstanding the extreme conditions prevailing in a smelting reaction process, where aggressive liquid slag is in contact with the lining at high temperatures and where intensive bath turbulence under a pressurized reaction process occurs. The cooler panels 32 must have sufficient mechanical strength and stability to withstand abrasion against the sliding solid burden material. In particular, the cooler panels 32 must be able to withstand the above-described extreme or emergency situations in the reaction process. The cooler panels 32 also must not distort to an extent that the pressurized coolant 46 can enter the reaction process through any cracks, thereby risking an explosion.

Three basic design criteria for the cooler panels 32 are (1) the ratio of the effective surface area of the hot face (i.e., surface 52) to the effective surface area of the cold face (i.e., surface 53), (2) the rate of flow of coolant through the cooler panels, and (3) the thickness of the cooler panel wall 50 across which the heat must be conducted. With respect to the coolant flow, the design criteria include the specific heat value and the boiling point of the coolant 46. In particular, the coolant flow rate should be sufficient to maintain the coolant 46 at a temperature below its boiling point, and to prevent nucleate boiling. With respect to the heat transfer wall thickness, the design criteria include the specific heat conductivity of the cooler panel material.

In the present embodiment, the cooler panels 32 are designed and sized for manufacturing capability and ease of installation. The cooler panels 32 generally are cast, and are installed by insertion through the opened top end of the vessel. The cooler panels 32 preferably are equally sized. In the present embodiment, a ring of 10 equally sized cooler panels 32 is installed.

In the present embodiment, each cooler panel 32 is composed of cast copper plate material, and the coolant 46 is water. The maximum cooler panel plate thickness at the hot face (i.e., the distance between the hot face and the nearest coolant contact surface) is 20 mm and the minimum specific heat conductivity of the plate material is 320 kcal/m/h/°C. (at 0° C.). The maximum ratio of cooler panel hot face to coolant contact surface projected onto the hot face is 1.3. The minimum coolant flow velocity to suppress nucleate (isolated) boiling in the water coolant is 2.4 m/s.

Of course, other cooler panel plate materials and coolants may be used in the refractory lining system of the present invention. For example, alternative cooler panel plate materials include copper-bronze and aluminum, and the water coolant optionally may include antifreeze. Those skilled in the art readily will be able to determine the design criteria for these and other alternative cooler panel plate materials and coolants suitable for a particular application.

The ram mixture 34 satisfies a number of design criteria features of the refractory system of the present invention. First, the ram mixture 34 is a heat transfer material designed to effectively conduct and transfer heat from the refractory brick lining 30 to the cooler 32. Therefore, the ram mixture 34 preferably has a highly uniform conductivity throughout its thickness, and most preferably in the range of about 80 to 160 BTU-in/ft²-hr-°F.

The ram mixture preferably is a mixture of free carbon in the amount of about 10 to 30 wt. %, SiC in the amount of about 50 to 80 wt. %, $SiO_2$ in the amount of about 5 to 18 wt. %, and $Al_2O_3$ in the amount of about 1 to 10 wt. %.

The vessel 10 of the present embodiment is made using a ram mixture 34 including the constituent elements and characteristics set forth below in Table 3.

TABLE 3

| Material | Amount (wt. %) |
|---|---|
| RAM MIX COMPOSITION | |
| Free Carbon | 17 |
| SiC | 68 |
| $SiO_2$ | 10 |
| $Al_2O_3$ | 3 |
| Other* | 5 |
| OTHER CHARACTERISTICS | |
| Density-fired, pcf | 108 |
| Effective conductivity | 85 $BTU\text{-}in/ft^{2\circ}F\text{-}hr$ |

(*Includes about 3 wt. % Sodium-silicate type binders and other oxides such as iron-oxide.)

Of course, those skilled in the art readily will be able to select alternative ram mixtures suitable for any particular application.

It also will be appreciated that the ram mixture 34 provides dimensional stability. The refractory brick lining 30 and the cooler panels 32 generally have different thermal expansion rates. This tends to cause formation of air gaps between the refractory bricks 38 and the cooler panels 32. These air gaps could greatly reduce the efficiency of heat conductivity. Accordingly, in the present embodiment the ram mixture 34 preferably is installed in such a manner that intimate contact is made and maintained between the ram mixture 34 and each of the refractory bricks 38 and the cooler panels 32, to maximize heat conductivity and transfer. In the present embodiment, this installation is achieved by a pneumatic injection/ramming of the ram mixture 34, to substantially eliminate formation of any air gaps.

It further will be appreciated that the high temperature steelmaking reaction process of the present embodiment is a dynamic reaction process. Moreover, this process requires a start-up process following preheat. In the initial heat and in reheats, the refractory brick lining 30 generally is directly exposed to the molten slag layer 26. Thus, as noted above, the molten layer of slag 26 gradually will erode the interior face 44 of the refractory brick 38, until the reaction process reaches an equilibrium state and a protective frozen slag layer 42 is formed and maintained on the interior surface 44 of the refractory brick 38. In order to control and minimize the erosion of the refractory brick 38, the present inventors have determined that initial oxidation and erosion may be substantially reduced by coating the MgO-graphite refractory brick 38 with a glaze former, such as potassium silicate, sodium silicate, or mixtures thereof with clay. For example, a suitable clay is high purity calcined kaolin (mineral) clay. In the present embodiment, the glaze former is an air-setting mortar, e.g., Seneca Chief, manufactured by North American Refractory Company. Alternative glaze formers include borate glasses, which are low temperature glaze formers. Of course, those skilled in the art readily will be able to identify alternative glaze formers suitable for a particular application.

It will therefore be appreciated that the high temperature reaction vessel of the present embodiment achieves all of the above-listed objects and advantages of the present invention.

Figure 7:
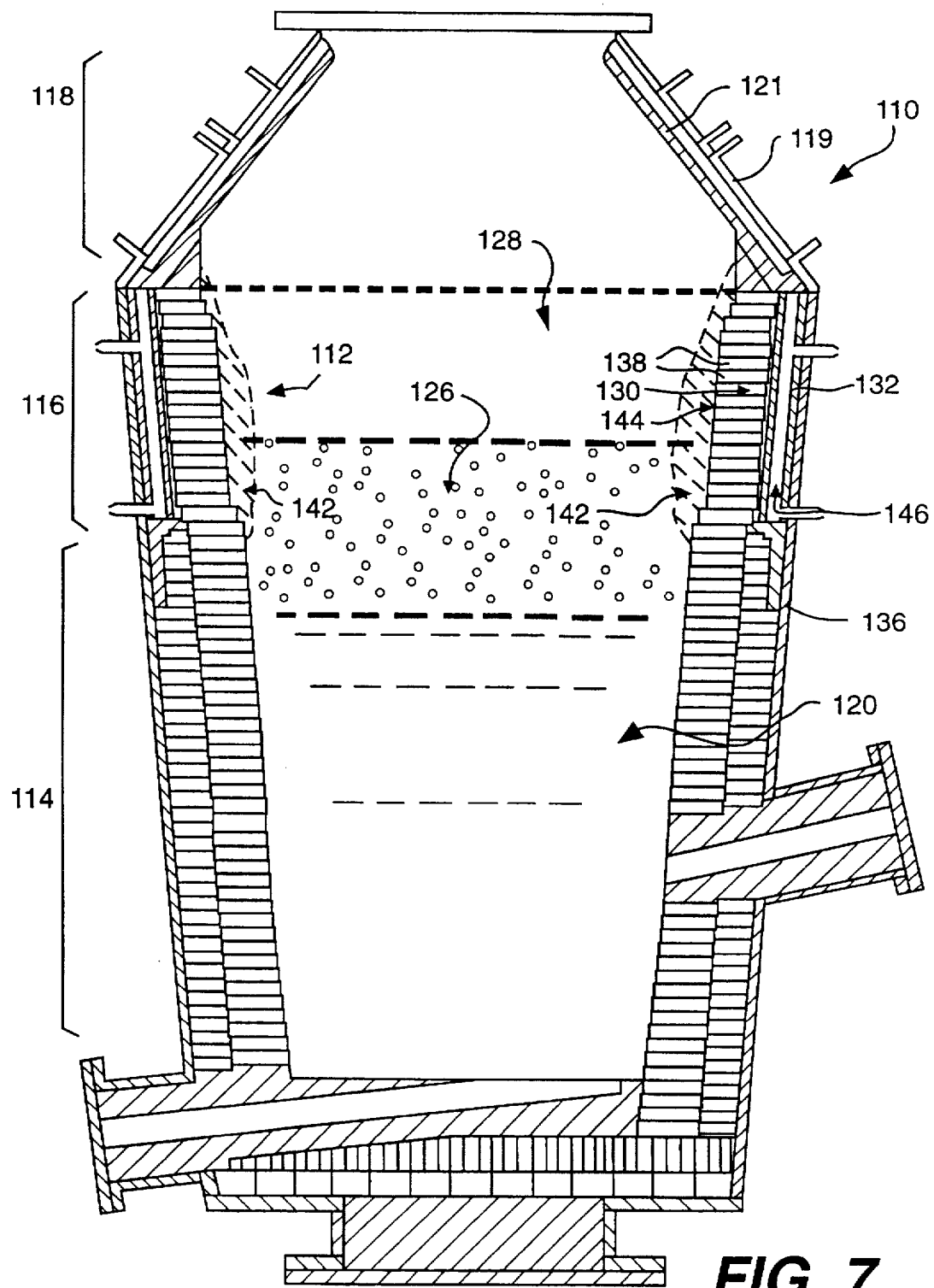
FIG. 7 is a cross-sectional view of a refractory-lined high temperature reaction vessel according to a second embodiment of the present invention.

FIG. 7 schematically illustrates another embodiment of a high temperature reaction vessel 110 according to the present invention. In the embodiment of FIG. 7, the construction of the reaction vessel 110 is substantially similar to the embodiment of FIG. 1. For example, the reaction vessel 110 includes a lower portion 114 for holding the liquid metal 120, a central portion 116, including a refractory lining 112, and an upper portion 118, including cooling panels 119 and a refractory material 121. However, in the embodiment of FIG. 7, the refractory lining 112 includes only a refractory brick lining 130 and cooler panels 132; the refractory lining 112 does not include any ram mixture.

The utilization of the reaction vessel 110 and refractory lining 112 of the embodiment of FIG. 7 is substantially the same as the reaction vessel and refractory lining of the embodiment of FIG. 1. In this regard, although it is believed that the refractory lining 112 of FIG. 7 will not operate as efficiently as the refractory lining 12 of FIG. 1, because it does not include a heat transfer material (ram mixture 34) to enhance the vessel's thermal conductivity and dimensional stability, it may provide satisfactory utility in certain applications.

Figure 8:
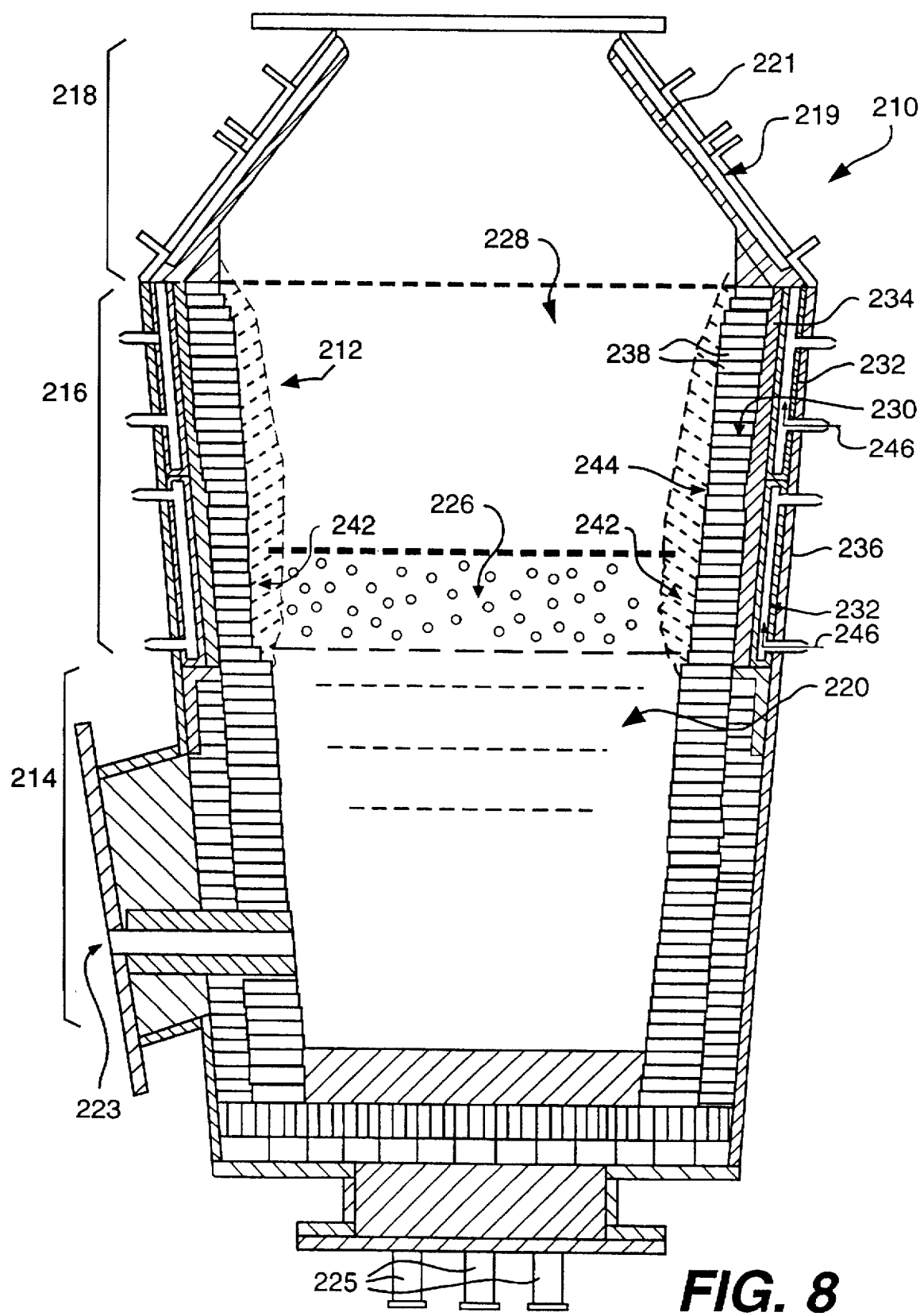
FIG. 8 is a cross-sectional view of a refractory-lined high temperature reaction vessel according to a third embodiment of the present invention.

FIG. 8 schematically illustrates a third embodiment of a high temperature reaction vessel 210 according to the present invention. In the embodiment of FIG. 8, the construction of the reaction vessel 210 is substantially similar to the embodiment of FIG. 1. For example, as shown, the reaction vessel 210 includes a lower portion 214 for holding the liquid metal 220, a central portion 216, including a refractory lining 212, and an upper portion 218, including hollow cooling panels 219 and a refractory material 221. The refractory lining 212 includes a refractory brick lining 230, hollow cooler panels 232 and a ram mixture 234 disposed therebetween. However, in the embodiment of FIG. 8, the relative vertical length of central portion 216 is extended. Specifically, in this embodiment, two rings of 10 cooler panels 232 are provided. FIG. 8 also illustrates three tuyeres 225, e.g., for blowing in nitrogen gas to stir the reaction process, and a tap hole 223, for tapping liquid metal 220 from the reaction vessel 210. The embodiment of FIG. 8 provides an advantage over the embodiment of FIG. 1, in that the vessel 210 has a relatively larger volume for slag formation and post combustion in the reaction process, including a larger free space 228 for accommodating the foamy slag layer 226.

Figure 9A:
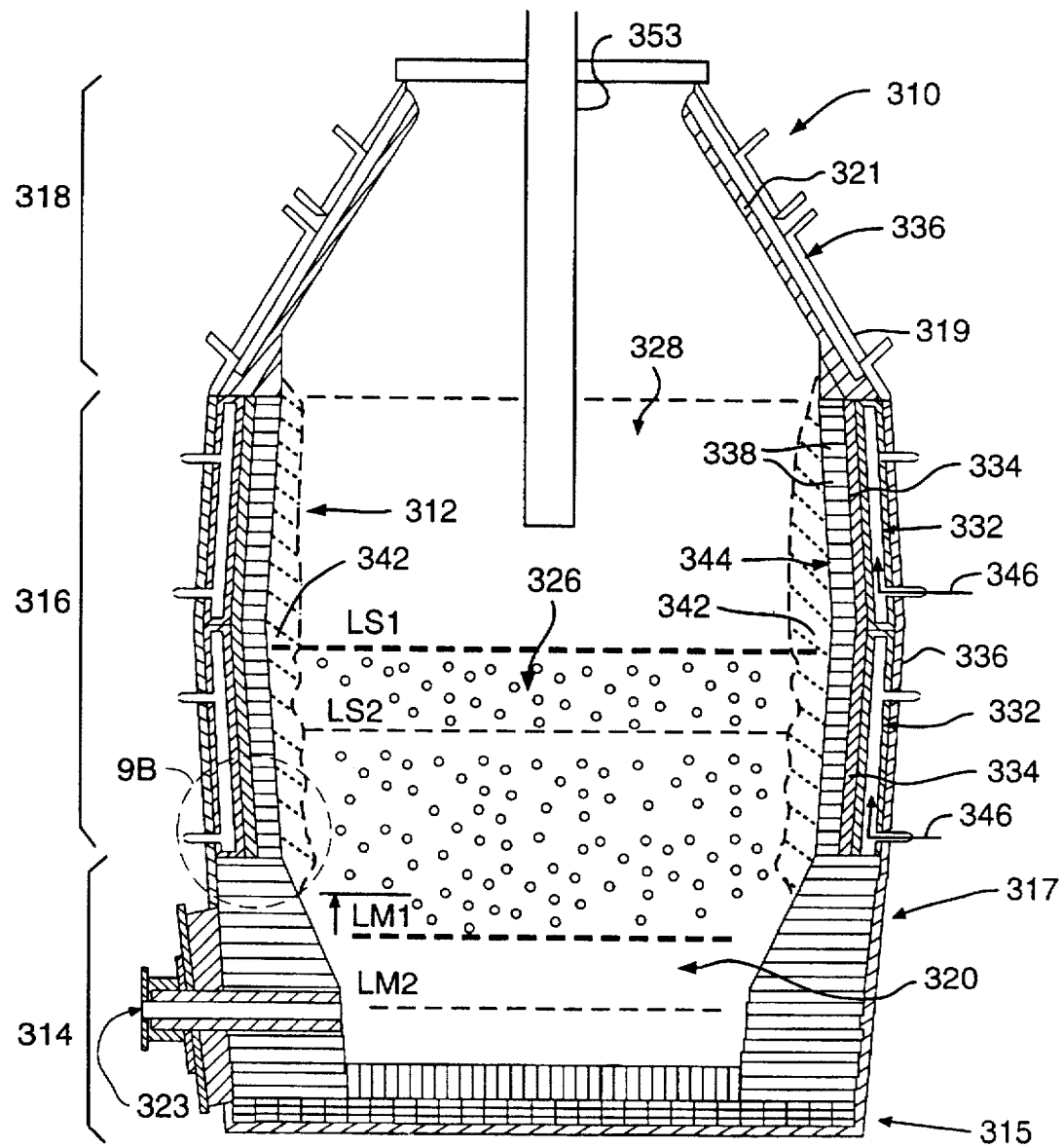
FIG. 9A is a cross-sectional view of a refractory-lined high temperature reaction vessel according to a fourth embodiment of the present invention.

FIG. 9A schematically illustrates a fourth embodiment of a high temperature reaction vessel according to the present invention. In the embodiment of FIG. 9A, the construction of the reaction vessel 310 is substantially similar to the embodiment of FIG. 8. For example, as shown, the reaction vessel 310 includes a lower portion 314, included a tap hole 323, a central portion 316, including a refractory lining 312, and an upper portion 318, including cooling panels 319 and a refractory material 321. The refractory lining 312 includes a refractory brick lining 330, cooler panels 332 and a ram mixture 334 disposed therebetween. However, in the embodiment of FIG. 9A, the vessel 310 also has a relatively broad and thick base portion 314, for accommodating one or more tap holes 323. This also provides a greater relative tap volume (illustrated as the region between a first (pretap) metal level ($L_{M1}$) and a second (post tap) metal level ($L_{M2}$)). Further, as discussed in greater detail above, in the direct steelmaking process of the present invention, the refractory brick lining is believed to eventually achieve a stable or equilibrium state at a thickness of about 4 to 6 inches. Accordingly, in the embodiment of FIG. 9A, the refractory brick lining is designed to have an initial preheat thickness of about 6 inches. This reduces the cost of manufacturing the vessel 310, minimizes transition time to equilibrium, and minimizes the amount of refractory material absorbed into the slag during initial preheat and reheat processes, while maintaining desired refractory lining stability. Also, as in the embodiment of FIG. 8, the vessel 310 in FIG. 9A is advantageous in that it provides a central portion 316 having a relatively large volume, including a relatively large free space 328. Thus, this embodiment can easily accommodate a greater relative fluctuation in the slag volume (illustrated as the region between a first slag level ($L_{S1}$) and a second slag level ($L_{S2}$)) associated with the tapping of the liquid metal, and permits greater flexibility in designing and locating a lance 353 for introducing raw materials to the reaction process.

Figure 9B:
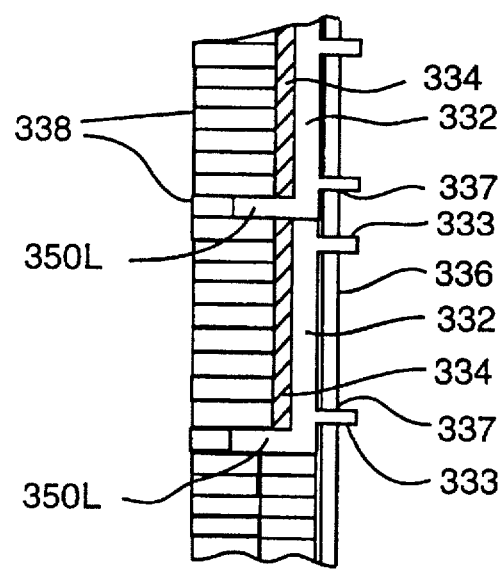
FIG. 9B is an enlarged detail view of an alternative embodiment of the reaction vessel wall of FIG. 9A, including a cooler having an L-shaped cross-section.

Finally, FIG. 9B is an enlarged sectional view of a portion of the wall of the reaction vessel in FIG. 9A, illustrating an alternative embodiment for cooler panels 332. Specifically, in the embodiment of FIG. 9B, each cooler panel 332 has an L-shaped cross-section forming an annular ledge or base portion 350L extending radially inward. The refractory bricks 338 then are assembled in refractory rings and stacked on the annular ledge 350L. In this manner, the embodiment of FIG. 9B provides a significant advantage, in that refractory bricks located in the lower vessel portion 314 below the refractory lining 312, which are unprotected by the present refractory lining 312 and subject to relatively higher wear over time, may be removed and replaced without having to also remove and replace the refractory bricks 338 of the refractory lining 312 (i.e., disassemble and reassemble the refractory rings).

Although the present invention has been described with reference to specific embodiments thereof, it is not limited to such specific embodiments. Those skilled in the art readily will appreciate numerous equivalent embodiments and modifications of the present invention, including alternative structures and elements, without departing from the spirit of the invention, which is defined in the following claims.

What is claimed is:

1. A smelting method for use in a vessel including a refractory lining having a surface that faces the interior of the vessel, and a hollow cooler disposed exterior to the refractory lining, the cooler including a cooler hot face surface in thermal contact with the refractory lining, and a coolant heat transfer surface in contact with a moving coolant having a thermal conductivity, the method comprising the steps of:

forming a layer of slag on a melt in the vessel, the slag in said layer of slag having a softening point temperature range; and forming a protective frozen layer of slag on the interior facing surface of the refractory lining in at least a portion of a zone where the interior facing surface contacts the layer of slag, and maintaining the protective frozen layer of slag in or about the softening point temperature range of the slag.

2. The method recited in claim 1, wherein the vessel is a smelter having a postcombustion zone, and wherein the step of forming a protective frozen layer of slag comprises controlling the temperature of the slag adjacent the refractory lining at least in the postcombustion zone of the vessel.

3. The method recited in claim 1, wherein the step of forming a protective frozen layer of slag comprises circulating coolant through the cooler at a rate sufficient to extract heat through the refractory lining, from the layer of slag to the cooler, so that a thin frozen layer of slag is formed and maintained on the interior facing surface of the refractory lining.

4. The method recited in claim 3, further comprising the step of selecting a ratio of effective cooler hot surface to coolant heat transfer surface to maximize extraction of heat in the coolant circulating step.

5. The method recited in claim 3, further comprising the step of selecting a flow rate of coolant through the cooler sufficient to maintain the coolant at a temperature below the boiling point of the coolant.

6. The method recited in claim 5, further comprising the step of selecting a flow rate of coolant through the cooler sufficient to substantially suppress nucleate boiling of the coolant.

7. The method recited in claim 1, further comprising the step of including magnesia (MgO) in the layer of slag in an amount sufficient to promote formation of a slag coating.

8. A smelting method according to claim 1, further including the step of maintaining the operating pressure in the vessel in a range of about 10 to 50 psi.

9. A smelting method according to claim 2, further including the step of injecting $O_2$ in the postcombustion zone in the vessel.

10. A smelting method according to claim 1, wherein the step of forming and maintaining a protective frozen layer includes maintaining a slag thickness in the range of about 0.12 to about 0.25 inch, maintaining the process temperature in a range of about 1500° C. to about 1800° C., and maintaining the thermal conductivity in a range of about 12.5 to about 25 BTU-in/ft$^2$-°F.-hr.

11. A smelting method according to claim 1, further including the step of selecting a hollow cooler having a cooler thickness of about 20 mm, a cooler hot face surface having a minimum specific heat capacity of about 320 kcal/m/h/°C. (at 0° C.), a maximum ratio of cooler panel hot face to coolant contact surface of about 1.3, and a minimum coolant flow velocity of about 2.4 m/s.

12. A smelting method according to claim 1, further comprising the step of packing a ram mixture between the hollow cooler and the exterior of the refractory lining, the ram mixture having a thermal conductivity of about 80 to 160 BTU-in/ft$^2$-hr-°F.

13. A smelting method according to claim 1, further comprising the step of packing a ram mixture between the hollow cooler and the exterior of the refractory lining, said ram mixture including free carbon, SiC, SiO$_2$, and Al$_2$O$_3$, such that the ram mixture has a thermal conductivity of about 80 to 160 BTU-in/ft$^2$-hr-°F.

14. A smelting method according to claim 1, further comprising the step of packing a ram mixture between the hollow cooler and the exterior of the refractory lining, said ram mixture including free carbon in the range of 10 to 30 wt %, SiC in the range of 50 to 80 wt %, SiO$_2$ in the range of 5 to 18 wt %, and Al$_2$O$_3$ in the range of 1 to 10 wt %, such that the ram mixture has a thermal conductivity of about 80 to 160 BTU-in/ft$^2$-hr-°F.

15. A smelting method as recited in claim 14, wherein the ram mixture includes free carbon in an amount of about 17 wt %, SiC in an amount of about 68 wt %, SiO$_2$ in an amount of about 10 wt %, and Al$_2$O$_3$ in an amount of about 3 wt %.

16. A smelting method for use in a vessel including a refractory lining having a surface that faces the interior of the vessel and a hollow cooler disposed exterior to the refractory lining, the cooler including a cooler hot face surface in thermal contact with the refractory lining and a coolant heat transfer surface in contact with a moving coolant having a thermal conductivity, the vessel being a smelter having a postcombustion zone, the cooler having a thickness of about 20 mm, a cooler hot face surface having a minimum specific heat capacity of about 320 kcal/m/h/°C. (at 0° C.), a maximum ratio of cooler panel hot face to coolant contact surface of about 1.3, and a minimum coolant flow velocity of about 2.4 m/s, the method comprising the steps of:

forming a substantially horizontal layer of slag on a melt in the vessel, the slag in said layer having a softening point temperature range;

forming a protective frozen layer of slag on the interior facing surface of the refractory lining in at least a portion of a zone where the interior facing surface contacts the substantially horizontal layer of slag, and maintaining the temperature of the protective frozen layer of slag in or about the softening point temperature range of the slag, said frozen slag layer forming and maintaing step including:

controlling the temperature of the slag adjacent the refractory lining at least in the postcombustion zone of the vessel;

maintaining a slag thickness in the range of about 0.12 to about 0.25 inch, maintaining the process temperature in a range of about 1500° C. to about 1800° C., and maintaining the thermal conductivity in a range of about 12.5 to about 25 BTU-in/ft$^2$-°F.-hr;

circulating a coolant through the cooler at a rate sufficient to extract heat through the refractory lining, from the layer of slag to the cooler, so that a thin frozen layer of slag is formed and maintained on the interior facing surface of the refractory lining;

selecting a ratio of effective cooler hot surface area to coolant heat transfer surface area to maximize extraction of heat in the coolant circulating step; and selecting a flow rate of coolant through the cooler sufficient to maintain the coolant at a temperature below the boiling point of the coolant and to substantially suppress nucleate boiling of the coolant;

maintaining the operating pressure in the vessel in a range of about 10 to 50 psi;

injecting $O_2$ in the postcombustion zone in the vessel; and including magnesia (MgO) in the layer of slag in an amount sufficient to promote formation of a slag coating.

17. A smelting method according to claim 16, further comprising a step of packing a ram mixture between the hollow cooler and the exterior of the refractory lining.

18. A smelting method according to claim 16, further comprising a step of packing a ram mixture between the hollow cooler and the exterior of the refractory lining, said ram mixture including free carbon, SiC, $SiO_2$, and $Al_2O_3$, such that the ram mixture has a thermal conductivity of 80 to 160 BTU-in/ft$^2$-hr-°F.

19. A smelting method according to claim 16, further comprising a step of packing a ram mixture between the hollow cooler and the exterior of the refractory lining, said ram mixture including free carbon in the range of 10 to 30 wt %, SiC in the range of 50 to 80 wt %, $SiO_2$ in the range of 5 to 18 wt %, and $Al_2O_3$ in the range of 1 to 10 wt %, such that the ram mixture has a thermal conductivity of 80 to 160 BTU-in/ft$^2$-hr-°F.

20. A smelting method as recited in claim 19, wherein the ram mixture includes free carbon in an amount of about 17 wt %, SiC in an amount of 68 wt %, $SiO_2$ in an amount of about 10 wt %, and $Al_2O_3$ in an amount of about 3 wt %.

* * * * *